United States Patent [19]
Petchul et al.

[11] 3,966,615
[45] June 29, 1976

[54] OIL COLLECTION BARGE

[76] Inventors: Sigvald L. Petchul; Richard K. Petchul, both of 1380 SW. 57th Ave., Plantation, Fla. 33314

[22] Filed: June 25, 1974

[21] Appl. No.: 483,018

[52] U.S. Cl. .................. 210/242 R; 210/DIG. 25
[51] Int. Cl.² ............................................ E02B 15/04
[58] Field of Search ......... 210/84, 83, 242, DIG. 21

[56] References Cited
UNITED STATES PATENTS

| | | | |
|---|---|---|---|
| 3,615,017 | 10/1971 | Valdespino | 210/DIG. 21 |
| 3,630,376 | 12/1971 | Price | 210/242 |
| 3,662,892 | 5/1972 | Sorensen | 210/DIG. 1 |
| 3,664,505 | 5/1972 | Brittingham | 210/DIG. 21 |
| 3,695,441 | 10/1972 | Chastan-Bagnis | 210/242 |
| 3,704,784 | 12/1972 | Craggs et al. | 210/242 |
| 3,708,070 | 1/1973 | Bell | 210/DIG. 21 |
| 3,715,034 | 2/1973 | Ivanoff | 210/242 |
| 3,823,828 | 7/1974 | Derzhartes | 210/242 |

*Primary Examiner*—Theodore A. Granger
*Attorney, Agent, or Firm*—Oltman and Flynn

[57] ABSTRACT

A device which collects and then contains and concentrates oil spills on the surface of water. This action is affected by the flow of water and oil relative to a channel with an adjustable water and oil intake funnel at the forward end, an oil blockage wall at the rear, an adjustable flow splitter at the rear, a water vent at the rear bottom, and an adjustable vent plate at the rear bottom. These devices enable the operation of said action over large areas in a minimum of time and do so even given an adverse sea state.

8 Claims, 4 Drawing Figures

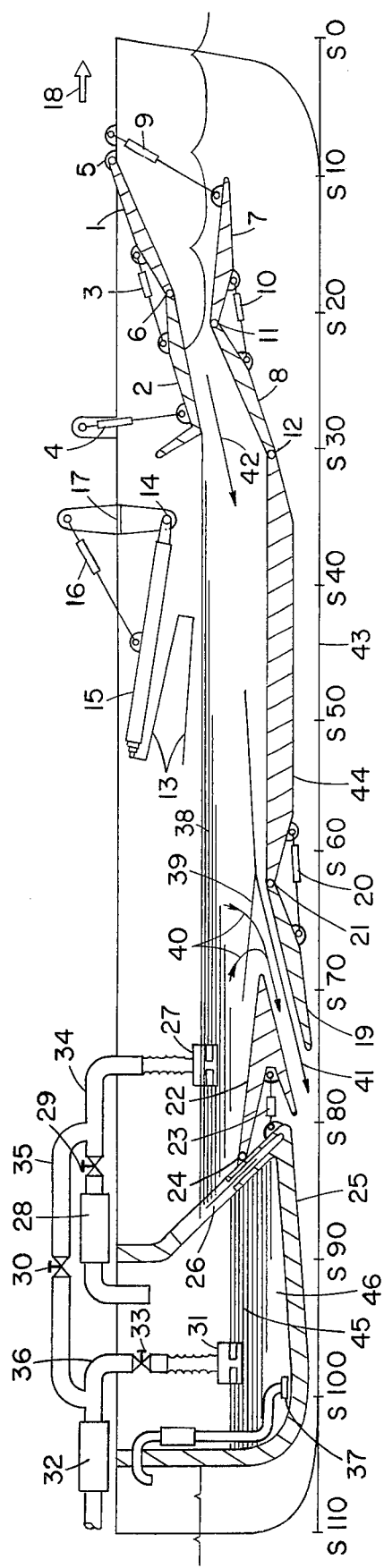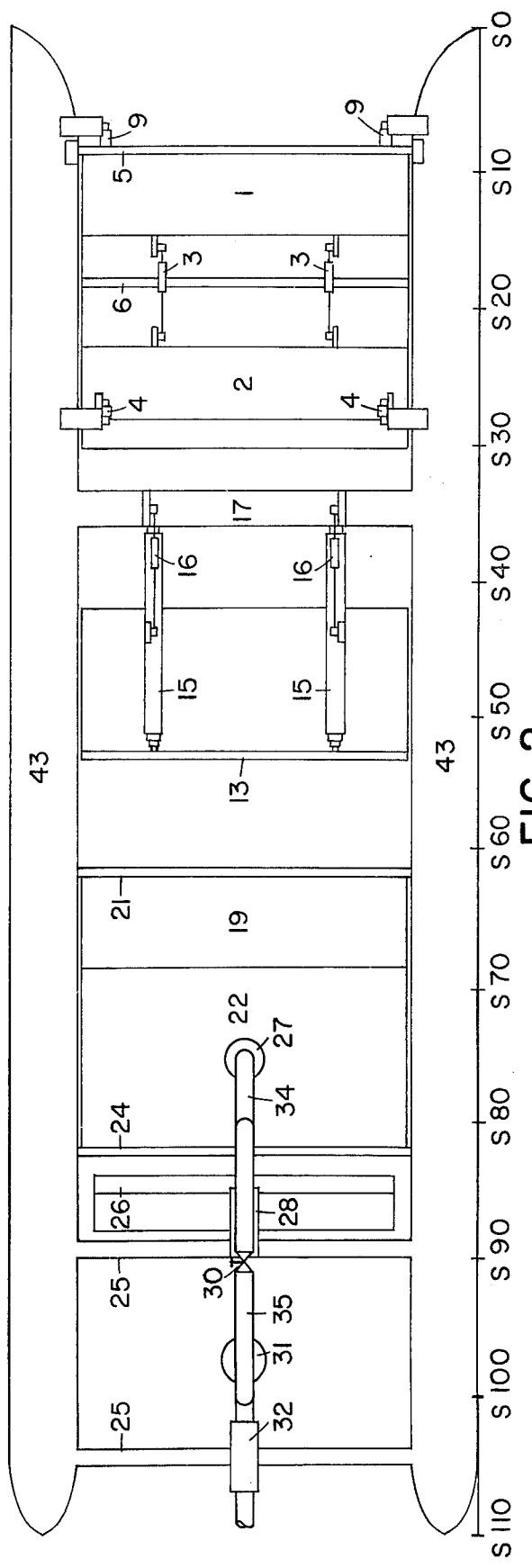

OIL COLLECTION BARGE

SUMMARY

The oil collection barge is a device which is intended for use in cleaning up oil spills in water and is especially useful where ultra large spills and adverse sea states are concerned. The device is capable of covering large areas quickly while it deals with the sea state and forces the oil floating in the path of the barge into the channel where the oil is not only contained but also rapidly concentrated. As a result of this initial concentration of the oil slick the actual separation process is made more efficient.

The oil collection equipment and devices consist of a longitudinal U shaped channel with an adjustable water and oil intake funnel or wave dampner at the forward end, an oil blockage wall at the rear, an adjustable flow splitter at the rear, a water vent at the rear bottom and an adjustable vent plate at the rear bottom such that water enters through the funnel, flows through the channel, and flows out the vent and such that a fluid or particle which is lighter than water, referred to henceforth as oil, will enter through the funnel, flow aft in the channel, and be trapped by the blockage wall and channel sides, where all such action is the result of sufficient fore to aft water flow relative to the barge and by proper manipulation of said adjustable devices. The trapped oil is removed from the channel surface and transferred to a holding tank by means of a spill gate, a floating suction bell and pump, or any other suitable means. Any of these removal means may be aided by the action of the surface plow.

DESCRIPTION OF VIEWS

FIG. 1 is a schematic elevation of the oil collection barge.

FIG. 2 is a plan view of the oil collection barge.

DETAILED DESCRIPTION

Figure 3:
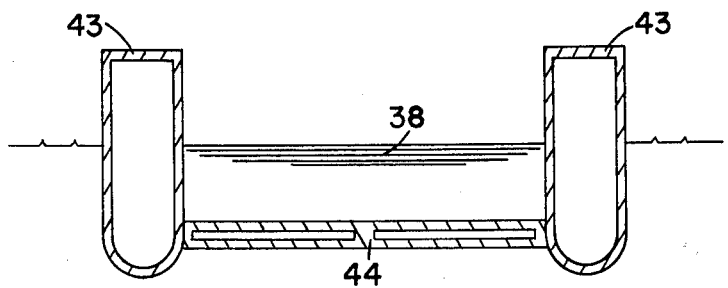
FIG. 3 is a typical cross section of the channel and sponsons.
Figure 4:
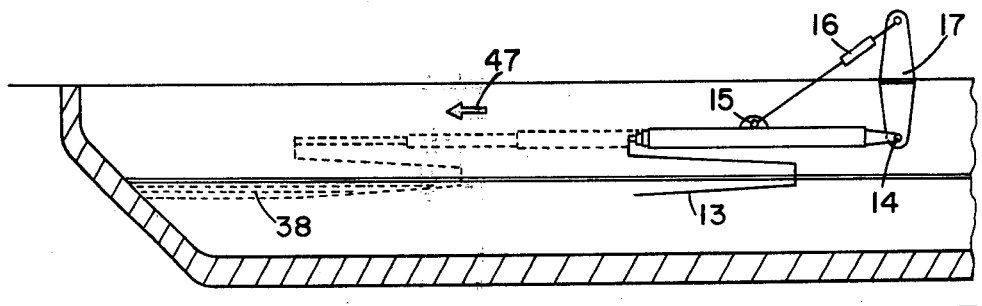
FIG. 4 is a schematic elevation of the surface plows extension.

The barge unit provides the necessary floatation for the oil collection equipment with the waterlevel in relationship to the devices generally as shown in FIGS. 1, 3 and 4. The barge unit can be of catamarran type as shown, however, any suitable type of floatation may be substituted. The oil collection barge can be towed, pushed, self propelled or in the case of considerable water velocity it can be moored in the current. The size and proportions can vary depending on the application and the details shown are only schematic representations of the basic idea.

The intake funnel or wave dampner introduces the water and oil 42 into the separating channel in a controlled manner while providing protection from the sea state. The intake funnel as shown in FIGS. 1 and 2 consists of adjustable upper and lower funnel jaws both of which extend the full channel width with close clearances and are longitudinally located at the forward open end of the channel. An upper jaw includes plates 1 and 2. The forward edge of plate 1 is pivoted at hinge 5, and the position of the upper jaw is controlled by rams 4. The upper funnel jaw's central pivot on hinge 6 between plates 1 and 2 is controlled by hydraulic rams 3, henceforth referred to as rams. The upper funnel jaw squashes waves and its variations allow efficient operation under many conditions. A lower jaw includes plates 7 and 8. The aft edge of plate 8 is pivoted at hinge 12, and the position of the lower jaw is controlled by ram 9. The lower funnel jaw's central pivot on hinge 11 between plates 7 and 8 is controlled by rams 10. The lower funnel jaw varies the depth of cut below the waterlevel which varies rate of flow and provides flexability for waves of different height.

The separating channel as shown in FIGS. 1, 2 and 3 provides an area in which water and oil can flow and float, respectively, substantially unaffected by the sea state reducing emulsification. The channel's sides are formed by sponsons 43 and the bottom by crossover 44. Sponsons 43 constitute horizontally spaced, upstanding sidewalls, with crossover 44 constituting a bottom wall between the side walls. The channel extends from station 30 to 85 and has the intake funnel at the forward end, the blockage wall at the rear, the flow splitter at the rear, the vent at the rear bottom, the vent plate at the rear bottom and the surface plow which operates in the area of the channel.

The water vent and vent plate as shown in FIGS. 1 and 2 discharge the water 41 from the separating channel in a controlled manner while providing protection from the sea state. The water vent is an opening that extends the full channel width generally between the flow splitter 22 and the vent plate 19. The vent plate 19 extends the full channel width with close clearances and is longitudinally located between stations 62 and 75. Plate 19 pivots on hinge 21 and is controlled by rams 20. The vent plate is adjustable to compensate for or create a change in flow rate.

The blockage wall forms the rear end of the separating channel and contains the oil on the surface in the channel along with the channel sides. The blockage wall as shown in FIGS. 1 and 2 is formed by the forward end of crossover 25. The adjustable flow splitter 22 that extends the full channel width with close clearances and located longitudinally between stations 68 and 83 as shown in FIGS. 1 and 2 pivots on hinge 24 and is controlled by rams 23. The flow splitter creates a flow 39 which counteracts or supercedes the tendency for suction 40 on the surface oil. An excess of flow 39 is undesirable and thus the splitter is adjustable to hold it to the minimum under varying conditions.

In operation the oil collection barge moves forward thru or relative to the water indicated by arrow 18 shown in FIGS. 1 and 2. As it moves forward it skims oil and water thru the adjustable funnel into the separating channel, indicated by flow 42. As the oil and water flow to the rear of the channel the oil 38 will float to and or on the surface. When the oil 38 reaches the rear of the channel it will be trapped on the surface of the water in the channel as the lower layer of water 41 flows out the vent. This action is primarily the result of proper adjustment of the flow splitter 22 and vent plate 19, however the adjustment of the intake funnel is also important. The oil 38 will continue to build up in the channel as the operation continues and the excess of a sufficient thickness for efficient removal from the surface of the water in the channel can be removed continuously.

The surface plow is used to aid in the removal of the oil from the surface, its action is to thicken the oil on the surface. The surface plow as shown in FIGS. 1, 2 and 4 consists of the actual U shaped plow 13 which extends the full channel width and is attached to the extendable boom 15 which pivots on hinge 14 and is controlled by rams 16. Hinge 14 and rams 16 are mounted on member 17. As shown in FIG. 4 the plow extends, indicated by arrow 47, along the surface, thickening the oil as it goes. The thickened oil is then removed and the plow is raised from the surface and retracted to the position shown in FIG. 1.

There are two methods shown of removing the oil from the surface, they are by spilling and pumping as shown in FIG. 1. In the case of spilling the spill gate and actuator means 26 is adjusted vertically so that surface oil 38 will spill into the holding tank formed by crossover 25. In the case of pumping, floating suction bell 27 can have suction applied by pump 28 or 32. Pump 28 applies suction to bell 27 through pipe 34 where valve 29 is open and valve 30 is closed, in this case the oil is pumped to the holding tank. Pump 32 supplies suction to bell 27 through pipe 35 where valve 29 and 33 are closed and valve 30 is open, in this case the oil is pumped directly to a holding barge which would be towed behind the collection barge. Pump 32 is also used to apply suction to bell 31 through pipe 36 where valve 33 is open and valve 30 closed, in this case the oil has been pumped or spilled into the holding tank first. The advantage to pumping or spilling to the holding tank is that gravity separation can occur and the oil 45 pumped to the holding barge would be relatively free of water 46. The excess water 46 is pumped out of the holding tank by pump and suction means 37.

The proportions of the oil collection barge as shown are generally suited to a size of 110 feet in length and 35 feet in width. This would give the channel an effective width of 35 feet and thus at a speed of 10 knots 1 square nautical mile could be cleared of oil in approximately 19 hours, allowing time to switch the holding barges. Although the device is well suited to ultra large spills smaller units could clean up common spills rapidly. It should be apparent that various changes may be made in the size, proportions, construction, execution and arrangement of the device without departing from the spirit and scope of the invention.

What I claim is:

1. In a barge for collecting, containing and concentrating oil on the surface of water comprising:
   a generally U-shaped longitudinally extending channel comprising two horizontally spaced, upstanding sidewalls with a bottom wall extending between them and adapted to receive water with oil on the surface thereof;
   an entrance opening at the forward end of said channel through which water and oil may enter said channel for flow therethrough;
   an upstanding wall at the rear end of said channel at which the oil on the surface of the water collects; and
   a vent at the bottom wall of said channel forward of said rear wall for allowing water to flow out of said channel;
   the improvement comprising:
   an adjustable flow splitter consisting of a generally V-shaped member extending generally transversely across said channel with the apex of the V forming a trailing edge of said vent and the sides of the V extending rearwardly;
   an adjustable vent plate extending transversely across said channel generally paralleling the apex of said V-shaped member and defining a leading edge of said vent;
   means for adjusting the position of said V-shaped member, thereby controlling the flow pattern of water at said vent; and
   means for adjusting the position of said vent plate, thereby controlling the size of said vent.

2. The barge as defined in claim 1 in which said entrance opening comprises:
   a first jaw pivotally connected to said channel at the upper side of said opening; and
   a second jaw pivotally connected to said channel at the lower side of said opening;
   said jaws providing wave dampening action.

3. The barge as defined in claim 2 including:
   means for pivotaly adjusting the position of said first jaw; and
   means for pivotally adjusting the position of said second jaw.

4. The barge as defined in claim 3 including:
   a holding tank aft of said rear wall; and
   a spillway in said rear wall for allowing oil to spill from said channel into said tank.

5. The barge as defined in claim 3 including:
   a holding tank aft of said rear wall; and
   means for pumping oil from said channel to said tank.

6. The barge as defined in claim 5 including:
   a spillway in said rear wall for allowing oil to spill from said channel into said tank.

7. The barge as defined in claim 1 including:
   a holding tank aft of said rear wall; and
   means for transferring oil from said channel to said holding tank.

8. The barge as defined in claim 7 including:
   means for transferring oil from said holding tank to the exterior of said barge.

\* \* \* \* \*